US009577836B1

(12) United States Patent
Leske et al.

(10) Patent No.: US 9,577,836 B1

(45) **Date of Patent: *Feb. 21, 2017**

(54) CHAT-ENABLED SOCIAL CIRCLES

(71) Applicant: Google Inc., Mountain View, CA (US)

(72) Inventors: Matthew John Leske, San Francisco, CA (US); Per Johan Gustafsson, Stockholm (SE); Lars Olof Joakim Lindholm, Stockholm (SE); Christopher David Vander Mey, Seattle, WA (US)

(73) Assignee: Google Inc., Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/480,536

(22) Filed: Sep. 8, 2014

Related U.S. Application Data

(63) Continuation of application No. 13/164,676, filed on Jun. 20, 2011, now Pat. No. 8,832,190.

(51) Int. Cl.

| | |
|---|---|
| ***G06F 15/16*** | (2006.01) |
| ***H04L 12/18*** | (2006.01) |
| ***H04L 12/58*** | (2006.01) |

(52) U.S. Cl.
CPC ........... *H04L 12/1813* (2013.01); *H04L 51/04* (2013.01)

(58) Field of Classification Search
USPC .......................... 709/204, 206; 715/753, 759
See application file for complete search history.

(56) References Cited

U.S. PATENT DOCUMENTS

| | | | | |
|---|---|---|---|---|
| 5,950,200 | A | 9/1999 | Sudai et al. | |
| 7,917,853 | B2 | 3/2011 | Trauth | |
| 7,945,653 | B2 | 5/2011 | Zuckerberg et al. | |
| 8,010,418 | B1 * | 8/2011 | Lee | G06Q 30/02 705/26.7 |
| 8,031,170 | B2 | 10/2011 | Brown et al. | |
| 8,966,643 | B2 * | 2/2015 | Chen | G06Q 10/10 726/26 |
| 2005/0021624 | A1 | 1/2005 | Herf | |
| 2005/0027802 | A1 | 2/2005 | Madsen et al. | |
| 2005/0198131 | A1 | 9/2005 | Appelman et al. | |
| 2007/0143401 | A1 | 6/2007 | Lance et al. | |
| 2008/0154915 | A1 * | 6/2008 | Flake | G06Q 30/02 |
| 2008/0235592 | A1 | 9/2008 | Trauth | |
| 2008/0320096 | A1 * | 12/2008 | Szeto | 709/207 |
| 2010/0306773 | A1 | 12/2010 | Lee et al. | |
| 2011/0083101 | A1 | 4/2011 | Sharon et al. | |
| 2011/0270709 | A1 | 11/2011 | Lewis et al. | |

* cited by examiner

*Primary Examiner* — Abdullahi E Salad
(74) *Attorney, Agent, or Firm* — Patent Law Works LLP

(57) ABSTRACT

Methods, systems, and apparatus, including computer programs encoded on a computer storage medium, for chat-enabling a social circle in response to user input provided by a first user, the social circle being defined by the first user and including one or more contacts, the one or more contacts including a second user, for each of the one or more contacts, issuing a chat service subscription request, determining that a subscription request associated with the second user is fulfilled, and in response to determining that the subscription request associated with the second user is fulfilled, adding the second user as a chat contact of the first user and adding the first user as a chat contact of the second user.

15 Claims, 7 Drawing Sheets

Start
602 First user chat-enable $SC_1$? N / Y
600
604 Second user ∈ $SC_1$? N / Y
606 Issue subscription request directed to second user
608 Subscription request fulfilled? N / Y
610 Establish first user and second user as IM contacts
612 Establish first user visibility to second user based on $V_{SC1}$
End Search Mail Social.Network Videos Books More... Search

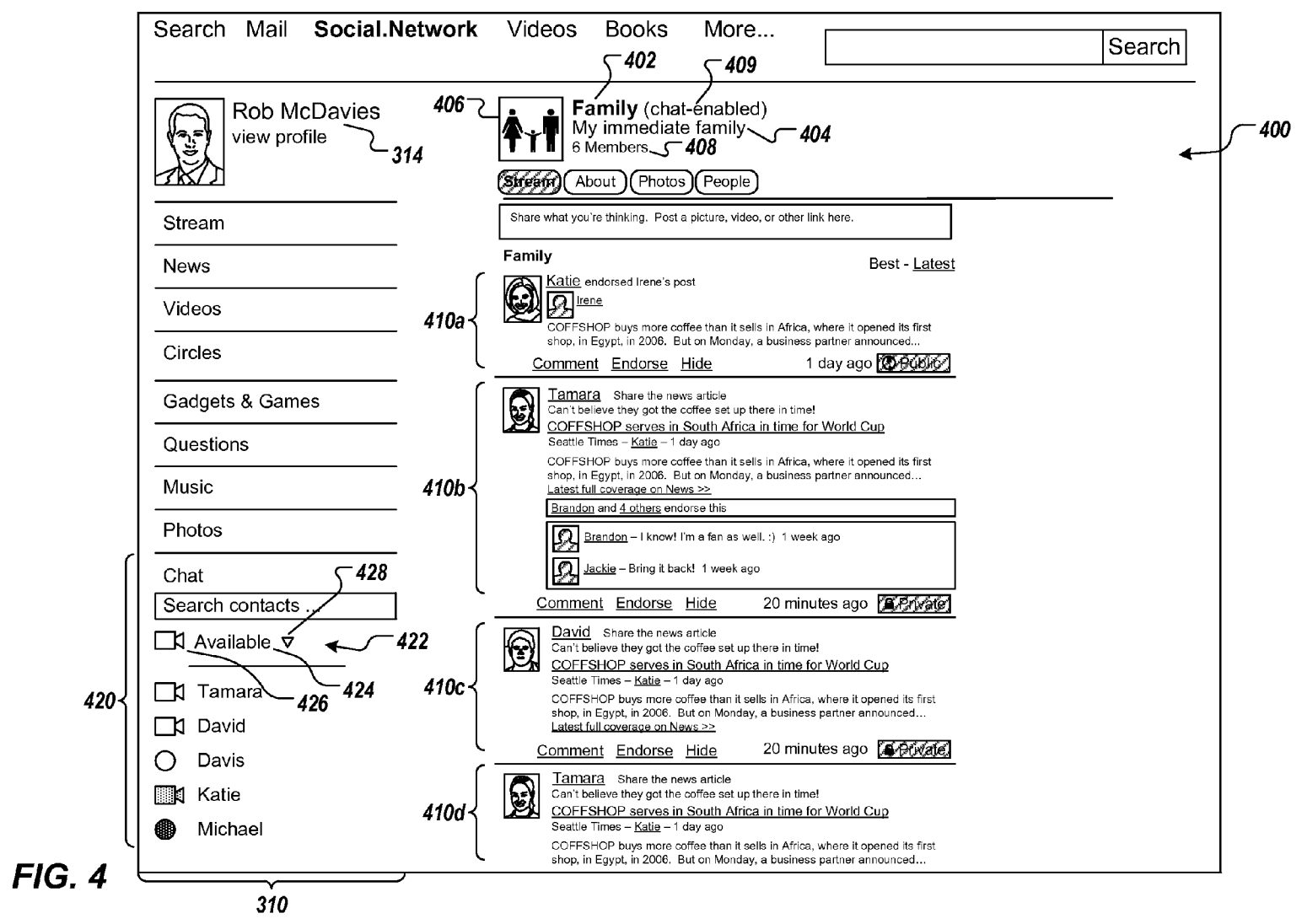

400

Rob McDavies
view profile
314

406 402 409
Family (chat-enabled)
My immediate family 404
6 Members 408

Stream About Photos People

Share what you're thinking. Post a picture, video, or other link here.

Stream
News
Videos
Circles
Gadgets & Games
Questions
Music
Photos

Chat 428
Search contacts ...
Available 422
424
Tamara 426
David
Davis
Katie
Michael
420
310

Family Best - Latest

410a
Katie endorsed Irene's post
Irene
COFFSHOP buys more coffee than it sells in Africa, where it opened its first shop, in Egypt, in 2006. But on Monday, a business partner announced...
Comment Endorse Hide 1 day ago Public 410b
Tamara Share the news article
Can't believe they got the coffee set up there in time!
COFFSHOP serves in South Africa in time for World Cup
Seattle Times – Katie – 1 day ago
COFFSHOP buys more coffee than it sells in Africa, where it opened its first shop, in Egypt, in 2006. But on Monday, a business partner announced...
Latest full coverage on News >>
Brandon and 4 others endorse this
Brandon – I know! I'm a fan as well. :) 1 week ago
Jackie – Bring it back! 1 week ago
Comment Endorse Hide 20 minutes ago Private 410c
David Share the news article
Can't believe they got the coffee set up there in time!
COFFSHOP serves in South Africa in time for World Cup
Seattle Times – Katie – 1 day ago
COFFSHOP buys more coffee than it sells in Africa, where it opened its first shop, in Egypt, in 2006. But on Monday, a business partner announced...
Latest full coverage on News >>
Comment Endorse Hide 20 minutes ago Private 410d
Tamara Share the news article
Can't believe they got the coffee set up there in time!
COFFSHOP serves in South Africa in time for World Cup
Seattle Times – Katie – 1 day ago
COFFSHOP buys more coffee than it sells in Africa, where it opened its first shop, in Egypt, in 2006. But on Monday, a business partner announced...

*FIG. 4*

CHAT-ENABLED SOCIAL CIRCLES

CROSS REFERENCE TO RELATED APPLICATIONS

This application is a continuation of and claims priority to U.S. application Ser. No. 13/164,676, filed Jun. 20, 2011, titled "Chat-Enabled Social Circles," which is incorporated by reference in its entirety.

TECHNICAL FIELD

This specification generally relates to computer software systems and methods, in particular, systems and methods for establishing contacts in a chat service (e.g., an instant messaging (IM) service).

BACKGROUND

Computers and mobile devices, such as mobile phones and personal digital assistants, have become increasingly interconnected due to the widespread availability of wired and wireless connections to communications networks such as the Internet. An example of an Internet based communication forum is a web-based social network, in which a number of users may be able to find each others' accounts and voluntarily become "friends" or "followers" of each other's posted messages. Users can post brief messages about their status, mood, activities, and such, and their contacts and followers can read and optionally reply to those messages. As such, contacts may stay abreast of each other's' activities as a tool for maintaining their social bonds.

SUMMARY

In general, innovative aspects of the subject matter described in this disclosure may be embodied in methods that include the actions of chat-enabling a first social circle in response to user input provided by a first user, the first social circle being defined by the first user and comprising one or more contacts, the one or more contacts comprising a second user, for each of the one or more contacts, issuing a chat service subscription request, determining that a subscription request associated with the second user is fulfilled, and in response to determining that the subscription request associated with the second user is fulfilled, adding the second user as a chat contact of the first user and adding the first user as a chat contact of the second user.

Other implementations of this aspect include corresponding systems, apparatus, and computer programs, configured to perform the actions of the methods, encoded on computer storage devices.

These and other implementations may each optionally include one or more of the following features. For instance, actions further include: chat-enabling a second social circle in response to user input provided by the second user, the second social circle being defined by the second user and including one or more contacts, the one or more contacts including the first user, wherein determining that the subscription request associated with the second user is fulfilled includes determining that the second social circle is chat-enabled; the subscription request associated with the second user includes an explicit notification to the second user inviting the second user to become a user of the chat service; determining that the subscription request associated with the second user is fulfilled includes receiving a confirmation from the second user; actions further include: setting a visibility of the first user based on user input associated with the first social circle, determining an availability status of the first user with respect to the second user based on the visibility, and transmitting availability data to display the availability status of the first user to the second user; actions further include chat-enabling a second social circle in response to user input provided by the first user, the second social circle being defined by the first user and comprising one or more contacts, the one or more contacts comprising the second user; actions further include: setting a first visibility of the first user based on user input associated with the first social circle, setting a second visibility of the first user based on user input associated with the second social circle, determining an availability status of the first user with respect to the second user based on the first visibility and the second visibility, and transmitting availability data to display the availability status of the first user to the second user; actions further include: chat-enabling a second social circle in response to user input provided by the first user, the second social circle being defined by the first user and comprising one or more contacts, the one or more contacts comprising a third user, determining that a subscription request associated with the third user is fulfilled, and in response to determining that the subscription request associated with the third user is fulfilled, adding the third user as a chat contact of the first user and adding the first user as a chat contact of the third user; actions further include: setting a first visibility of the first user based on user input associated with the first social circle, setting a second visibility of the first user based on user input associated with the second social circle, determining a first availability status of the first user with respect to the second user based on the first visibility, determining a second availability status of the first user with respect to the third user based on the second visibility, and transmitting availability data to display the first availability status to the second user and to display the second availability status to the third user; the first availability status and the second availability status are different; actions further include: receiving a request from the first user to display a web page associated with the first social circle, and transmitting web page data and chat display instructions to display the web page to the first user, wherein the chat display instructions, when executed, cause an IM interface to be displayed in the web page and the second user to be listed higher in a list of contacts provided in the IM interface than the third user; actions further include: receiving a request from the first user to display a web page associated with the second social circle, and transmitting web page data and chat display instructions to display the web page to the first user, wherein the chat display instructions, when executed, cause the IM interface to be displayed in the web page and the third user to be listed higher in the list of contacts provided in the chat interface than the second user; and the first social circle includes one or a personal social circle, a shared private social circle and a shared public social circle.

Implementations of the present disclosure provide one or more of the following example advantages: enabling real-time communication between contacts through a trusted mechanism (e.g., user-established social circles) without explicit actions required of users, providing predictable and easily controllable functionality for real-time communications, providing a simplified mechanism to set visibility preferences for communications with different groups of contacts, enabling visibility preferences to be automatically controlled based on time of day and/or day of week with different groups of contacts, encouraging messaging between contacts and improving a rendering of a chat roster by taking into account the context of where the chat roster is displayed and the contact groups.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 depicts a screen-shot of an example stream page for a personal social circle.

Like reference numbers represent corresponding parts throughout.

DETAILED DESCRIPTION

Figure 1:
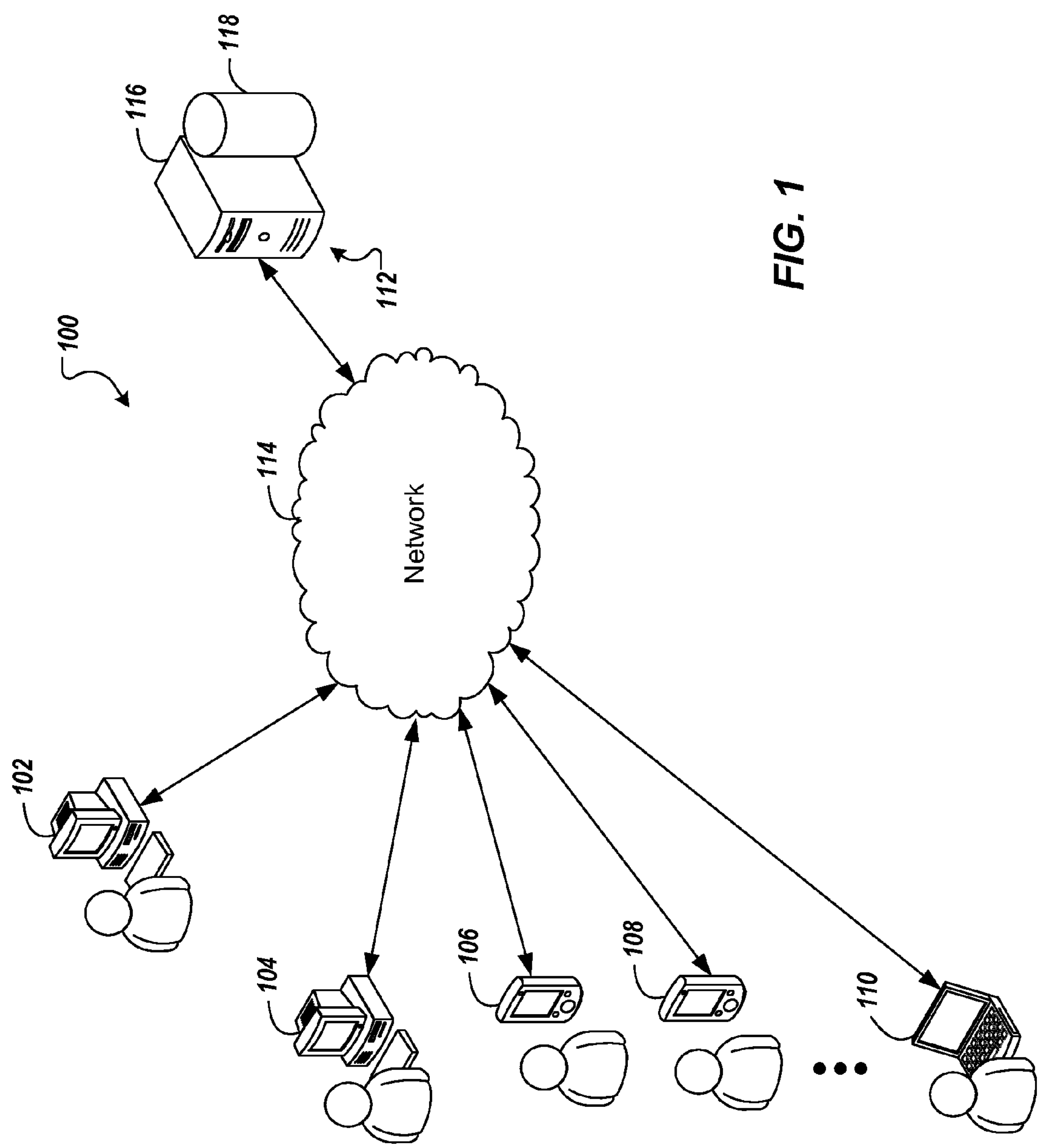
FIG. 1 is a diagram of an example network architecture.

In general, implementations of the present disclosure are directed to establishing contacts in a chat service, e.g., an instant messaging (IM) service. In some implementations, social circles defined within the context of a social networking service can be used to identify and connect with contacts in the IM service. A social circle can be provided as a user-defined grouping of contacts. A social circle can be used to define a distribution for digital content, as discussed in further detail herein.

In some examples, a first user of the social networking service can define one or more social circles that can include a second user as a contact within the social networking service. Note that the second user does not have to be a member of the social networking service. If the second user is a member of the social networking service, the second user of the social networking service can define one or more social circles that can include the first user as a contact within the social networking service. The first user can selectively enable a social circle including the second user for chat (e.g., chat-enable the social circle for IM). In response to chat-enabling the social circle, each user listed in the social circle (including the second user) is sent a subscription request. If a recipient of the subscription request adds or has added the first user to a chat-enabled social circle, or actively accepts the subscription request, the subscription request is fulfilled. Once the subscription requests are fulfilled, the first user can communicate with the other users through the IM service. For example, once the subscription request corresponding to the second user is fulfilled, the first user and the second user can communicate with one another through the IM service. In some implementations, the IM service can be provided as an IM service within the social networking service. In some implementations, the IM service can be a stand-alone service. In some implementations, the IM service can be integrated into one or more other services, such as an email service.

In some implementations, and as discussed in further detail herein, chat-enabled social circles can be used to define a user's availability status within the IM service. Example availability statuses, discussed in further detail herein, can include Available, Offline, Busy, Idle, Away and/or a custom availability message. A chat-enabled social circle can be used to set the visibility of a user with respect to contacts within the IM service. A visibility of a user can include whether one or more other users can see the user as a contact within the context of the IM service, and/or, if visible to other users, an availability status that can be presented to the other users. For example, the first user can chat-enable a first social circle and define a visibility for contacts in the IM service that are also members of the first social circle. The first user can chat-enable a second social circle and define a different visibility for contacts in the IM service that are also members of the second social circle. In this manner, the visibility of the user provided to contacts established using the first social circle can be different than the visibility of the user provided to contacts established using the second social circle.

In some implementations, subscription requests can be fulfilled indirectly or directly. In general, a subscription request can be an implicit or explicit request that a user receiving the request, or otherwise being associated with the request, become a contact of another user (i.e., the user on behalf of which a subscription request is sent) within the context of the IM service. For example, and continuing with the example above, a subscription directed to the second user can be issued when the first user chat-enables the first social circle. In some implementations, the second user is not made aware of the subscription request. The second user can chat-enable a social circle that includes the first user as a contact. In response to the social circle of the second user being chat-enabled a subscription directed to the first user can be issued. A backend system can recognize that mutual subscription requests have been issued for the first user and the second user and, in response, enable visibility and communication between the users through the IM service. In some implementations, the user to which a subscription request is directed can be made aware of the subscription request (e.g., using an auto-generated email, an alert within the social networking service). The user can explicitly confirm or deny the subscription request.

In general, social circles are categories to which a user can assign contacts and better control the distribution and visibility of social networking posts and/or other digital content distributed using the social networking service. In some implementations, a social circle can be provided as a data set defining a collection of contacts. Generally, a social circle can be described from the perspective of an individual that is the center of a particular collection of socially interconnected people, or from the aggregate perspective of a collection of socially interconnected people. A social circle can have narrowly defined boundaries (e.g., members of the social circle might be familiar with one another) and permission may be required for a contact to join a social circle. A user of the social networking service can define a social circle. The social circle, as a data set defining a collection of contacts, may reflect real-life social connections and/or interactions of the user. In some implementations, a social circle can be defined by a user as a personal representation or grouping of a set of contacts, the contacts may be unaware of the social circle and/or unaware of other members of the social circle.

Though the creation and use of social circles, the user can organize and categorize social networking contacts into various different groupings that can be used to control the visibility and access those contacts have to the user's postings, digital pictures, videos, audio files, hyperlinks (e.g., uniform resource indicators (URIs)), and/or other content associated with the user's social networking profile. As one example, the user can post an update about a technical nuance to only a "coworker" circle, and spare other contacts within the social networking service from seeing information that is irrelevant to them.

Instant messaging (IM) applications enable multiple users to "instantly" communicate over a network, such as the Internet. In general, an IM service includes a client-side IM interface executed as a computer program and/or within a browser application on a computing device of each participating user. A server-side application executed as one or more computer programs on one or more computing devices (i.e., server systems) coordinates communication between the users. The IM service provides real-time direct text-based communication between a plurality of users. In some implementations, the IM service can also provide file sharing capabilities (e.g., sharing audio files, image files, video files). In some implementations, IM services can also provide live voice (e.g., using a voice over Internet protocol (VoIP)) and/or video chatting.

In general, IM services enable a user to set a visibility, which defines an availability status that will be displayed to other contacts in the IM service. Example availability statuses can include Available, Offline, Busy, Idle, Away and/or a custom availability message. For example, the Available status can indicate that the user is online and is able to communicate through the IM service, and the Offline status can indicate that the user is not online. The Busy status can indicate that the user is online, but is attending to other matters and is unable to communicate through the IM service. The Idle status and/or Away status can indicate that the user is online, but may not be present at or currently interacting with the computing device providing the IM interface. A custom availability message can also be provided as an availability status. For example, a user can provide the message "on vacation," when the user is on vacation. In this manner, although the user may be logged into and available to chat with other contacts through the IM service, the other contacts will be aware that the user is on vacation.

A user can connect with other users through the IM service by inviting the other users to participate in the IM service. In some examples, a user can invite another user to participate in the IM service by initiating an explicit invitation, or subscription request that can be transmitted to the other user on behalf of the user by the IM service. Upon confirmation of the other user, the user and the other user become contacts within the context of the IM service.

As discussed in further detail herein, and in accordance with implementations of the present disclosure, a user can chat-enable social circles to invite other users to participate in the IM service by initiating a subscription request that can be directed to the other users. In some implementations, the subscription request can be implicit. In the case of an implicit subscription request, a user to which the subscription request is directed is not made aware of a pending subscription request. That is, each of the other users does not receive an explicit invitation to participate in the IM service as a contact of the requesting user. In some implementations, the user can invite others user to participate in the IM service by initiating an explicit subscription request that can be transmitted to the other user on behalf of the user by the IM service.

FIG. 1 is a diagram of an example network architecture 100. The network architecture 100 includes a number of client devices 102, 104, 106, 108, 110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102, 104, 106, 108, 110 access the server device 112 to participate in a social networking service. For example, the client devices 102, 104, 106, 108, 110 can execute web browser applications that can be used to access the social networking service and/or an IM service. In another example, the client devices 102, 104, 106, 108, 110 can execute software applications that are specific to the social networking service and/or the IM service (e.g., social networking and/or IM "apps" running on smartphones).

Users interacting with the client devices 102, 104, 106, 108, 110 can participate in the social networking service provided by the server system 112 by digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user may post a review of a movie to a movie review website, and with proper permissions that website may cross-post the review to the social networking service on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn.").

Users interacting with the client device 102, 104, 106, 108, 110 can also use the social networking service provided by the server system 112 to define social circles to organize and categorize the user's relationships to other users of the social networking service. Examples of the creation and use of social circles are provided in the description of FIG. 2, and throughout the remainder of the present disclosure.

Users interacting with the client devices 102, 104, 106, 108, 110 can use an IM service to communicate with contacts. Example contacts can include contacts established through the IM service and/or contacts established through the social networking service. In some examples, an IM interface can be provided on each of the client devices 102, 104, 106, 108, 110. The IM interface can be provided as a computer program that is executed by a client device and/or within a browser application executed on the client device. In some examples, the IM interface can be embedded as part of a website on one or more web pages that are displayed in the browser application. In some implementations, and as discussed in further detail herein, the IM interface displays a list of IM contacts of a user and can display an availability status corresponding to each of the IM contacts. The availability status can include a textual availability status (e.g., "Offline," "Available," "Busy") and/or an iconic availability status. An iconic availability status can include an icon that indicates an availability of the corresponding user. For example, a circle icon corresponding to a particular contact can be provided and a color of the circle icon can indicate the availability status of the particular contact (e.g., green indicates Available, red indicates Busy, grey indicates Offline, orange indicates Idle). In some implementations, a shape of the icon can indicate the availability status of the particular contact. In some implementations, a shape of the icon can indicate IM functionality enabled by the particular contact. For example, a circle icon can indicate only textual IM functionality, a phone-shaped icon can indicate textual and/or VoIP IM functionality, and a camera icon can indicate textual, VoIP and/or video chat IM functionality.

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
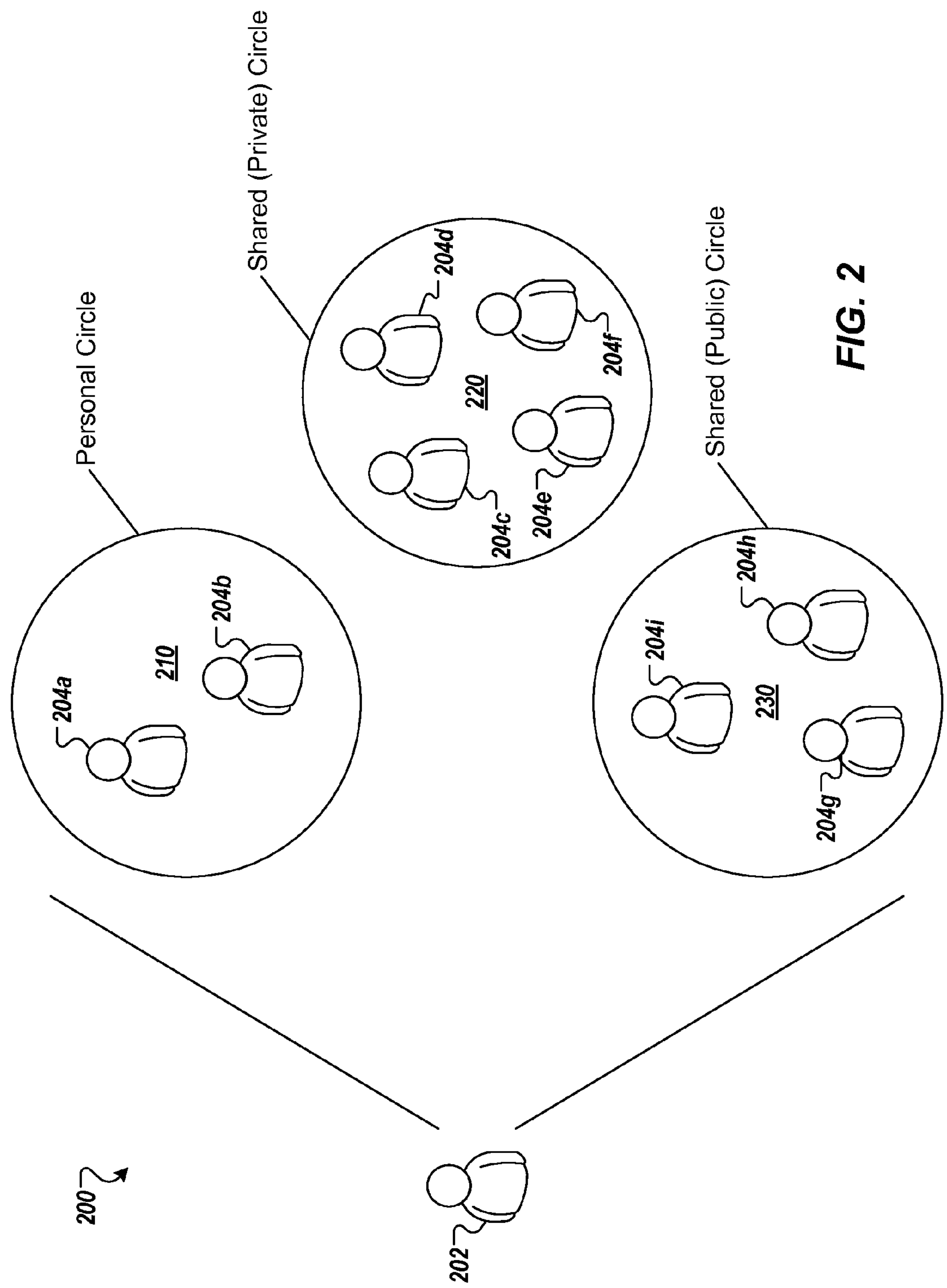
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204*a*, 204*b*, 204*c*, 204*d*, 204*e*, 204*f*, 204*g*, 204*h*, 204*i* with which the user 202 can have some form of relationship (e.g., friends, coworkers, customers, teammates, clients, relatives, club members, classmates). The user 202 categorizes the contacts 204*a*, 204*b*, 204*c*, 204*d*, 204*e*, 204*f*, 204*g*, 204*h*, 204*i* by assigning them to one or more social circles, such as a social circle 210, a social circle 220, and a social circle 230. A social circle 240, which has a number of contacts 242*a*, 242*b*, 242*c*, is provided as a query-based social circle that can be automatically generated without input from the user 202. In some implementations, the social circle 240 can be generated based on information gathered from and has some commonality among the user 202 and the users 242*a*, 242*b*, 242*c* (e.g., posts, uploaded photos, check-ins, volunteered location information).

The social circle 210 is a personal circle. In some implementations, personal circles are groupings created by and may be known only to the user 202 (e.g., the contacts 204*a*, 204*b* may receive no indication that they are in the user's 202 personal social circle 210). In some implementations, personal social circles are groupings created by the user 202 and may be known to the user 202 as well as the contacts (e.g., contacts 204*a*, 204*b*) that are members of the social circle (e.g., the contacts 204*a*, 204*b* receive an indication that they have been added to the personal social circle 210).

In some implementations, personal circles may be used to organize and categorize the contacts 204*a*, 204*b*, 204*c*, 204*d*, 204*e*, 204*f*, 204*g*, 204*h*, 204*i* in ways that are relevant to the user 202. In some implementations, the user 202 may use personal social circles to organize contacts in order to discretely target which of his contacts 204*a*, 204*b*, 204*c*, 204*d*, 204*e*, 204*f*, 204*g*, 204*h*, 204*i* will see certain postings or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can post information to be shared with other members of the shared private circle. For example, the user 202 may tend to post a large number of jokes to the social network. However, while some of the contacts 204*a*, 204*b*, 204*c*, 204*d*, 204*e*, 204*f*, 204*g*, 204*h*, 204*i* may find the jokes to be entertaining, others may find them to be simply annoying. Realizing this, the user 202 may create a "jokes" shared private circle and invite some or all of the contacts 204*a*, 204*b*, 204*c*, 204*d*, 204*e*, 204*f*, 204*g*, 204*h*, 204*i* to join. With the "jokes" social circle in place, the user 202 may post witticisms to the "jokes" circle, and only those contacts who have accepted the invitation are able to see the user's 202 comicality. Similarly, members of the shared private circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204*a*, 204*b*, 204*c*, 204*d*, 204*e*, 204*f*, 204*g*, 204*h*, 204*i*) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, non-members of the circle can request membership in the shared public circle, and membership in a shared public circle may be automatic upon request, or may require the user's 202 approval to become members of the shared public circle.

As discussed herein, any appropriate type of social circle can be chat-enabled. In some examples, each of a personal social circle, a shared private social circle and a shared public social circle can be chat-enabled.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

As discussed herein, digital content can be distributed to contacts within the social networking service including one or more social circles, such that they are exclusively viewable by the indicated contacts and/or contacts within one or more indicated social circles. For example, a user of the social networking service can generate a post and indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server system 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post).

In some implementations, the distribution data is processed to provide an access control list (ACL) that specifies which contacts within the social networking system are granted access to the post content. In some implementations, the distribution hub determines end points the post data set is to be distributed to based on the ACL. More specifically, the set of contacts that may care about the post and/or that are allowed access to the post is determined based on the ACL and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user.

Figure 3:
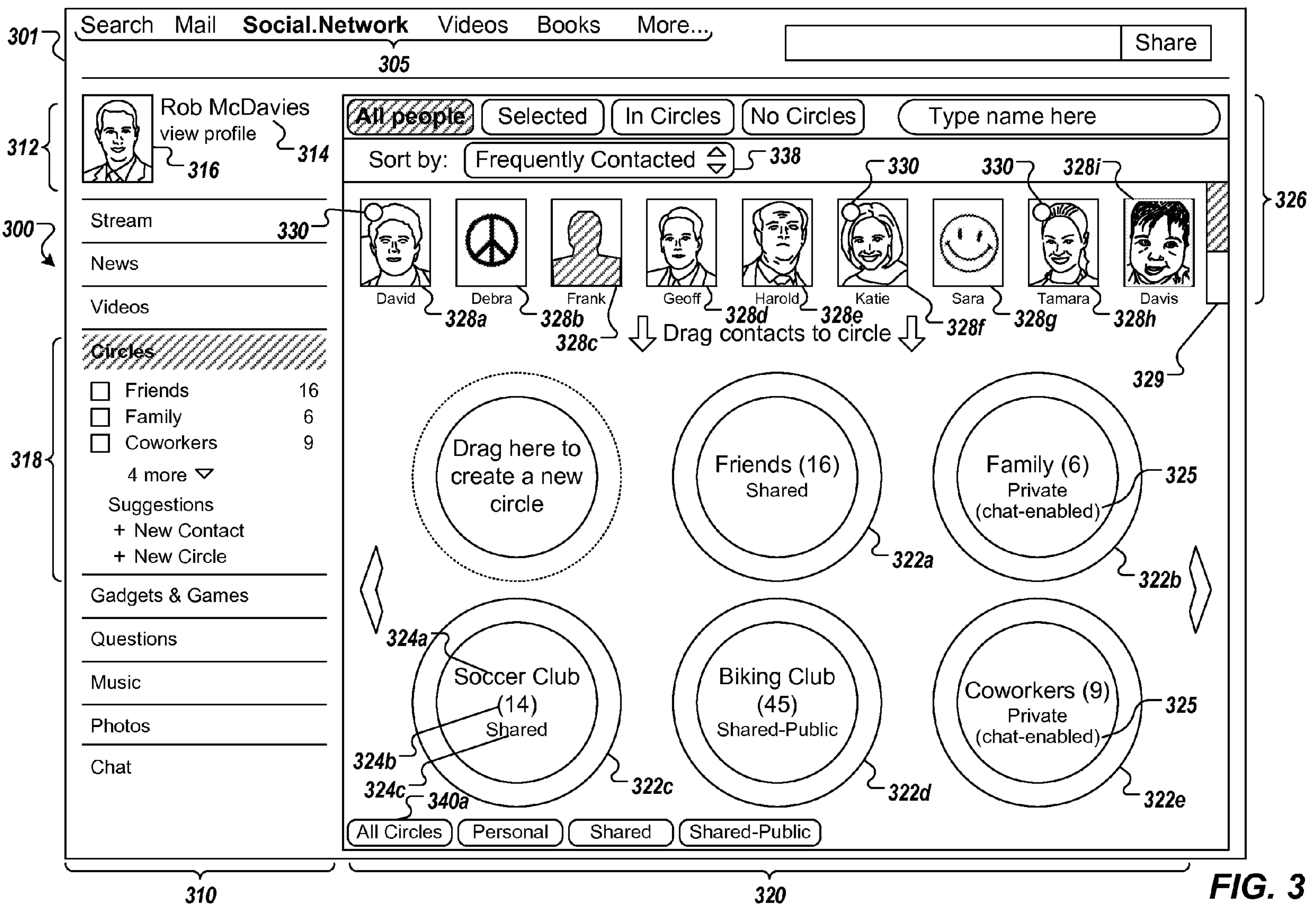
FIG. 3 depicts a screen-shot of an example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

The UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles sub-menu 318, when selected (e.g., as represented by the highlighting of the submenu's title), causes a social circle display 320 to be presented. The social circle display 320 includes a number of circles 322*a*, 322*b*, 322*c*, 322*d*, 322*e* that are visual representations of various social circles that the user has created or has permission to edit. Each of the circles 322*a*, 322*b*, 322*c*, 322*d*, 322*e* displays information about the social circle it represents. For example, the circle 322*c* displays a name 324*a*, a count 324*b* of the number of contacts associated with the social circle, and an indication 324*c* of what kind of circle (e.g., personal, private shared, public shared) that the circle 322*c* is.

In some implementations, and as discussed in further detail herein, an indicator can be provided as to whether a particular social circle is a chat-enabled social circle. In the example of FIG. 3, each of the social circles 322*b*, 322*e* include an indicator 325 indicating that the social circle 322*b*, 322*e* are chat-enabled social circles. A social circle can be chat-enabled based on user input to the UI 103. In some examples, a menu item and/or icon can be displayed to the user and can be activated (e.g., clicked on) to chat-enable a particular social circle. In some examples, a menu item and/or icon can be displayed to the user and can be activated (e.g., clicked on) to chat-disable an already chat-enabled social circle. For example, a user can perform a right-click action on a social circle. In response to the right-click input, a menu can be displayed, which menu can include options for chat-enabling or chat-disabling the particular social circle.

The social circle display 320 also includes a contact display 326. The contact display 326 provides a graphical interface for viewing, selecting, and organizing items in the user's contact lists. A collection of contact icons 328*a*, 328*b*, 328*c*, 328*d*, 328*e*, 328*f*, 328*g*, 328*h*, 328*i* represents the contacts or other entities (e.g., organizations, places, or other items) socially networked with the particular user. In some implementations, the icons can be digital photos of the contacts they represent (e.g., the icons 328*a*, 328*d*), arbitrary images (e.g., the icons 328*b*, 328*g*), or placeholders (e.g., when the contact has no image associated with their account, such as the icon 328*c*). Contacts who are members of one or more of the user's social circles are identified by an indicator 330 superimposed upon the icons (e.g., the icons 328*a*, 328*f*, 328*h*). A scroll bar 329 is provided for the user to access additional contact icons that may not fit into the initial view.

FIG. 4 depicts a screen-shot of an example stream page 400 for a personal social circle in the example social networking service. In general, a stream page can include a web page and/or a frame within a web page, within which digital content that is distributed to a user of the social networking service is displayed to the user. In general, the stream page 400 is displayed in response to the user selecting a social circle selector (e.g., in the social circles sub-menu 318 of FIG. 3). In the present example, the user has selected the "family" social circle pages to be displayed.

The stream page 400 includes a name block 402 that displays the name of the selected social circle, a description block 404 that displays a description of the selected social circle, an image 406 associated with the selected social circle. A count indicator 408 displays the total number of members of the selected social circle. In some implementations, an indicator 409 can be provided to indicate whether the particular social circle is a chat-enabled social circle. An input box 410 is provided in which the user can enter and/or identify digital content for distribution to other members of the selected social circle as an update (e.g., a post) when the other members view their social networking streams. It can be noted that, in the present example, the "family" social circle is a personal circle known only to the user. In some implementations, posts made to a personal circle may be visible only to contacts that the user has included in the personal social circle (e.g., the contacts do not necessarily know that they have been targeted to receive a particular update). The stream page 400 includes a number of posts 410*a*, 410*b*, 410*c*, 410*d*. In the illustrated example, the posts 410*a*, 410*b*, 410*c*, 410*d* include only the posts submitted by members of the selected social circle.

Referring again to FIG. 4, an example IM service can be provided within the context of the example social networking service. In some implementations, an IM interface 420 can be provided in the social network menu 310. The IM interface 420 can be used to distribute digital content to contacts of the user within the context of the IM service. In the example of FIG. 4, the IM interface 420 corresponds to the current user (i.e., the user currently logged into the social networking service, in the depicted example, "Rob McDavies") and includes a general status indicator 422 for the user. The status indicator 422 includes a textual availability status 424 (e.g., Available) and an iconic availability status (e.g., a camera icon). In the depicted example, the iconic availability status can include a color (e.g., green) corresponding to the textual availability status.

The status indicator 422 can include a menu icon 428 that can be selectively activated (e.g., clicked on) to display an availability status menu (not shown). The availability status menu can provide a list of availability statuses that can be selected by the user to reflect a current availability of the user to other contacts in the IM service. In some implementations, an explicitly selected availability status can override an availability status corresponding to a visibility defined by the user using one or more social circles, as discussed in further detail herein.

The IM interface 420 further includes a list of contacts that are contacts of the users through the IM service. In some implementations, a name of the contact is displayed as well as an iconic availability status. In the depicted example, the contact "Katie" includes an associated iconic availability status that includes a color (e.g., orange) corresponding to an Idle status. In the depicted example, the contact "Michael" includes an associated iconic availability status that includes a color (e.g., red) corresponding to a Busy status.

In some implementations, contacts in the list of contacts can be ordered based on the context of where the IM interface is displayed. In some examples, the order of contacts in the list of contacts can be based on a context of a web page that the IM interface is displayed in. In the example of FIG. 4, the IM interface 420 is displayed within the context of an example stream page 400 for a personal social circle, a "family" social circle page. Consequently, the list of contacts in the IM interface 420 can include contacts that are members of the "family" social circle at the top of the list. In the depicted example, the contacts "Tamara," "David," "Davis," and "Katie" might each be members of the "family" social circle and, consequently, are listed above the contact "Michael" in the list of contacts. If the context of the stream page changes, the order of contacts in the list of contacts can correspondingly change. For example, if the user selects a stream page for a "friends" social circle, the order of contacts in the list of contacts can change to include members of the "friends" social circle toward the top of the list.

The depicted example includes an IM service that is operable through a web page of the example social networking service displayed within a browser application. It is appreciated, however, that implementations of the present disclosure can be realized using an IM service that is operable through any appropriate application (e.g., as a stand-alone application executed on a client-device and/or a pop-out window of a browser application.

Figure 5:
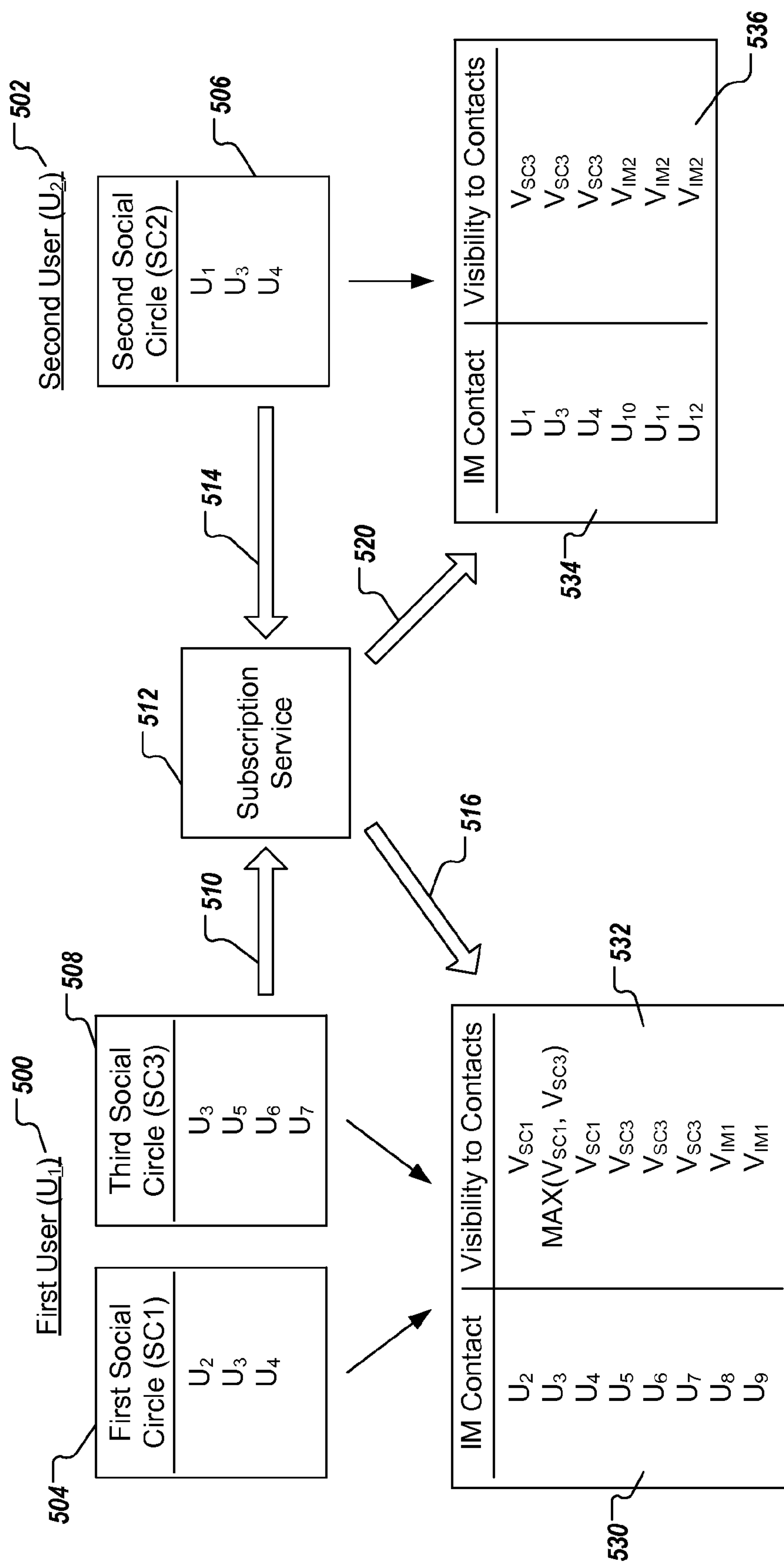
FIG. 5 depicts example graphical representations of chat-enabled social circles and corresponding IM contacts for respective users.

FIG. 5 depicts example graphical representations of chat-enabled social circles and corresponding IM contacts for respective users. In the example of FIG. 5, a first user ($U_1$) 500 and a second user ($U_2$) 502 can both be users of a social networking service. Within the context of the social networking service, and using one or more tools provided by the social networking service (e.g., the UI 301 of FIG. 3), the first user 500 can define a first social circle (SC1) 504. The first social circle 504 includes users $U_2$, $U_3$ and $U_4$ that are each contacts of the first user 500 within the social networking service. Within the context of the social networking service, and using one or more tools provided by the social networking service (e.g., the UI 301 of FIG. 3), the second user 502 can define a second social circle (SC2) 506. The first user 500 can further define a third social circle 508 (SC3). The third social circle 508 includes users $U_3$, $U_5$, $U_6$ and $U_7$ that are each contacts of the first user 500 within the social networking service.

The first user 500 can chat-enable the first social circle 504 and the third social circle 508, as discussed herein. In response to chat-enabling the first social circle 504 and the third social circle 508, respective subscription requests 510 directed to the users $U_2$-$U_7$ are generated and are issued. In some implementations, the subscription requests are transmitted to a subscription service 512 (e.g., one or more computer program applications executed using one or more computing devices). The subscription service 512 can manage the subscription requests 510 and can determine when one or more of the subscription requests is fulfilled.

The second user 502 can chat-enable the second social circle 506, as discussed herein. In response to chat-enabling the second social circle 506, respective subscription requests 514 directed to the users $U_1$, $U_3$ and $U_4$ are generated and are issued. In some implementations, the subscription requests are transmitted to the subscription service 512 (e.g., one or more computer program applications executed using one or more computing devices). The subscription service 512 can manage the subscription requests 514 and can determine when one or more of the subscription requests is fulfilled.

In the example of FIG. 5, the first user 500 issues a subscription request 510 directed to the second user 502, and the second user issues a subscription request 514 directed to the first user 500 by chat-enabling the first social circle 504 and the second social circle 506, respectively. Consequently, the respective subscription requests are fulfilled. Subscription confirmations 516 can be sent to an IM contact management service 518 that manages contacts of the first user 500 within the context of an IM service. Subscription confirmations 520 can be sent to an IM contact management service 522 that manages contacts of the second user 502 within the context of the IM service. In some implementations, the IM contact management services 518, 522 can be provided as one or more computer program applications executed on a server system.

In the example of FIG. 5, the first user 500 has contacts 530 established in the IM service. In this example, the contacts $U_2$, $U_3$, $U_4$, $U_5$, $U_6$ and $U_7$ can be contacts that are established through chat-enabling social circles as discussed herein. The contacts $U_8$ and $U_9$ can be contacts that are established using other means, such as a direct contact request, or invitation sent to the contacts $U_8$ and $U_9$ from the IM service on behalf of the first user 500. Each contact 530 includes an associated visibility (V) 532. The visibilities 532 define the availability status of the first user 500 that will be displayed to the individual contacts 530 at user-specified times.

In accordance with implementations of the present disclosure, the visibilities 532 associated with the contacts $U_2$, $U_3$, $U_4$, $U_5$, $U_6$ and $U_7$ (visibility $V_{SC1}$ and visibility $V_{SC3}$) are provided based on visibilities defined by the first user 500 in the first and third social circles 504, 508, because the contacts $U_2$, $U_3$, $U_4$, $U_5$, $U_6$ and $U_7$ are contacts established through chat-enabling of the first and third social circles 504, 508. The visibility 532 associated with each of the contacts $U_8$ and $U_9$ (visibility $V_{IM1}$) is provided based on a visibility defined by the first user 500 using the IM service.

In the illustrated example, the contact $U_3$ is a contact that is established through chat-enabling of the first social circle 504 and/or the third social circle 508, because the contact $U_3$ is a member of both the first and third social circles 504, 508. Consequently, the visibility 532 associated with the contact $U_3$ is based on visibilities (visibility $V_{SC1}$ and visibility $V_{SC3}$) defined by the first user 500 in the first and third social circles 504, 508. In this example, the visibility associated with the contact $U_3$ is provided as a maximum of $V_{SC1}$ and $V_{SC3}$, as discussed in further detail below.

In the example of FIG. 5, the second user 502 has contacts 534 established in the IM service. In this example, the contacts $U_1$, $U_3$ and $U_4$ and can be contacts that are established through chat-enabling social circles as discussed herein. The contacts $U_{10}$, $U_{11}$, $U_{12}$ can be contacts that are established using other means, such as a direct contact request, or invitation sent to the contacts $U_{10}$, $U_{11}$, $U_{12}$ from the IM service on behalf of the second user 502. Each contact 534 includes an associated visibility (V) 536. The visibilities 536 define the availability status of the first user 502 that will be displayed to the individual contacts 534 at user-specified times.

In accordance with implementations of the present disclosure, the visibility 536 associated with the contacts $U_1$, $U_3$ and $U_4$ (visibility $V_{SC2}$) are provided based on visibilities defined by the second user 502 in the second social circle 506, because the contacts $U_1$, $U_3$ and $U_4$ are contacts established through chat-enabling of the second social circle 506. The visibility 536 associated with each of the contacts $U_{10}$, $U_{11}$, $U_{12}$ (visibility $V_{IM2}$) is provided based on a visibility defined by the second user 502 using the IM service.

Based on the example depiction of FIG. 5, an illustrative example can be provided. The first user 500 and the second user 502 can each be members of a social networking service and can be co-workers. The first user 500 defines the first social circle 504 as a "co-worker" social circle and adds the contacts $U_2$ (i.e., the second user 502), $U_3$ and $U_4$ to the first social circle 504 (i.e., the contacts $U_3$ and $U_4$ are also co-workers of the first user 500). The first user 500 defines the third social circle 508 as a "family" social circle and adds the contacts $U_3$, $U_5$, $U_6$ and $U_7$ to the third social circle 508. In the illustrated example, the contact $U_3$ is both a co-worker and a family member of the first user 500.

Continuing with the illustrative example, the second user 502 defines the second social circle 506 as a "co-worker" social circle and adds the contacts $U_1$ (i.e., the first user 500), $U_3$ and $U_4$ to the third social circle 508 (i.e., the contacts $U_3$ and $U_4$ are also co-workers of the second user 508).

The first user 500 chat-enables the first social circle 504 and defines the visibility ($V_{SC1}$) of the first social circle 504. As noted above, the first social circle 504 is provided as a "co-worker" social circle. The visibility $V_{SC1}$ can be defined such that the availability status of the first user 500 is provided as "Available" from 9 AM-5 PM on weekdays and as "Offline" otherwise, for example. The first user 500 chat-enables the third social circle 508 and defines the visibility ($V_{SC2}$) of the third social circle 508. As noted above, the third social circle 508 is provided as a "family" social circle. The visibility $V_{SC3}$ can be defined such that the availability status of the first user 500 is provided as "Available" from 5 PM-10 PM on weekdays and 9 AM-7 PM on weekends and as "Busy" otherwise, for example. In response to chat-enabling of the first social circle 504, subscription requests 510 associated with the contacts $U_2$, $U_3$ and $U_4$ are issued. In response to chat-enabling of the third social circle 508, subscription requests 510 associated with the contacts $U_2$, $U_3$ and $U_4$ are issued. In some implementations, it can be recognized that a subscription request associated with the contact $U_3$ is pending or is already fulfilled. Consequently, a second subscription request can be foregone. In some implementations, the contacts $U_2$, $U_3$, $U_4$, $U_5$, $U_6$ and $U_7$ can be unaware that a subscription request has been issued. In some implementations, the contacts $U_2$, $U_3$, $U_4$, $U_5$, $U_6$ and $U_7$ can receive a notification that a subscription request has been issued.

The second user 502 chat-enables the second social circle 506 and defines the visibility ($V_{SC2}$) of the second social circle 506. As noted above, the second social circle 506 is provided as a "co-worker" social circle. The visibility $V_{SC2}$ can be defined such that the availability status of the second user 500 is provided as "Available" from 9 AM-5 PM on weekdays and as "Busy" otherwise, for example. In response to chat-enabling of the second social circle 506, subscription requests 514 associated with the contacts $U_1$, $U_3$ and $U_4$ are issued. In some implementations, the contacts $U_1$, $U_3$ and $U_4$ can be unaware that a subscription request has been issued. In some implementations, the contacts $U_1$, $U_3$ and $U_4$ can receive a notification that a subscription request has been issued.

The subscription service 512 receives the subscription requests 510, 514 and recognizes that both the first user 500 and the second user 502 have issued subscription requests. Consequently, the subscription service 512 fulfills the subscription requests and sends confirmations 516, 520, respectively, to establish a connection between the first user 500 and the second user 502 within the IM service. In the interest of brevity, it is assumed that subscription requests directed to the contacts $U_3$-$U_{12}$ are also fulfilled, such that a connection between the first user 500 and each of the contacts $U_3$-$U_9$ is established within the IM service, and a connection between the second user 502 and each of the contacts $U_3$, $U_4$, $U_{10}$, $U_{11}$ and $U_{12}$ is established within the IM service.

The availability status of the first user 500, as displayed to the second user 502 through the IM service, is governed by the visibility $V_{SC1}$ defined using the first social circle 504. As provided by way of example above, the visibility $V_{SC1}$ can be defined, such that the availability status of the first user 500 is provided as "Available" from 9 AM-5 PM on weekdays and "Offline" otherwise. Consequently, the availability status of the first user 500 is displayed to the second user 502 as "Available" from 9 AM-5 PM on weekdays and "Offline" otherwise. In some implementations, if the first user 500 is "online" and is logged into the IM service, the availability status of the first user 500 is displayed as "Offline" from 5:01 PM-8:59 AM on weekdays and on weekends. In some implementations, if the first user 500 is not "online," or is otherwise logged out of the IM service, the availability status can be displayed as "Offline" even from 9 AM-5 PM on weekdays.

The availability status of the first user 500, as displayed to the contact $U_3$ through the IM service, is governed by the visibilities $V_{SC1}$, $V_{SC3}$ defined using the first social circle 504 and the third social circle 508. As provided by way of example above, the visibility $V_{SC1}$ can be defined, such that the availability status of the first user 500 is provided as "Available" from 9 AM-5 PM on weekdays and "Offline" otherwise. As also provided by way of example above, the visibility $V_{SC3}$ can be defined such that the availability status of the first user 500 is provided as "Available" from 5 PM-10 PM on weekdays and 9 AM-7 PM on weekends and as "Busy" otherwise.

In this case, the visibilities $V_{SC1}$ and $V_{SC3}$ conflict. For example, the visibility $V_{SC1}$ defines the availability status as "Offline" from 5:01 PM-8:59 AM on weekdays, while the visibility $V_{SC3}$ defines the availability status as "Available" from 5 PM-10 PM on weekdays. To resolve this conflict, a relationship between $V_{SC1}$ and $V_{SC3}$ can be defined. In some implementations, a visibility of a particular type of social circle can be considered as greater than, trumping, or otherwise overriding a visibility of another type of social circle. For example, a visibility of a "Family" social circle may override a visibility of a "Co-worker" social circle. An example priority, or ranking can include:

$$V_{FAMILY}>V_{FRIENDS}>V_{COWORKERS}$$

where $V_{FAMILY}$ is a visibility of a "Family" social circle, $V_{FRIENDS}$ is a visibility of a "Friends" social circle, and $V_{COWORKERS}$ a visibility of a "Co-workers" social circle. In some implementations, the user can define the ranking of the respective visibilities. In the example depicted in FIG. 5, the availability status of the first user 500, as presented to the contact $U_3$ can be defined by the visibility $V_{SC3}$, because the third social circle 508 is a "Family" social circle and overrides the visibility corresponding to the first social circle 504, which is a "Co-worker" social circle.

In some implementations, availability statuses of conflicting visibilities can be compared and one availability status can be considered as greater than, trumping, or otherwise overriding a visibility of another type of social circle. For example, an Available status may override an Offline status. An example availability status priority, or ranking can include $$\text{Available}>\text{Busy}>\text{Offline}$$

In the depicted example, a maximum availability status can be determined between the availability statuses of the visibilities $V_{SC1}$ and $V_{SC3}$ for a given time and day. Consequently, an availability status of the first user 500, as presented to the contact $U_3$ can be defined by comparing an availability status of the visibility $V_{SC1}$ to an availability status of the visibility $V_{SC3}$, where the higher ranking availability status is the status that is displayed to the contact $U_3$. For example, at LOAM on a weekday, the availability status of the visibility $V_{SC1}$ is provided as "Available" and the availability status of the visibility $V_{SC3}$ is provided as "Busy." Consequently, the availability status "Available" is displayed to the contact $U_3$.

In some implementations, a user can chat-disable a social circle. For example, the user can provide user input to the UI 300 to chat-disable a particular social circle and/or can delete the social circle. In response to chat-disabling a social circle, underlying subscription requests that are pending or that had been previously confirmed can be cancelled. Consequently, contacts that had been previously established in the IM service through chat-enabling the social circle are no longer contacts in the IM service. In some implementations, the user that the social circle belongs to is no longer be listed as a contact in the IM interfaces of the other contacts. In some implementations, an availability status of the user that the social circle belongs is displayed as "Offline" to the other contacts.

In some implementations, social circles can be used to initiate a group chat, in which multiple contacts participate. A group chat can include a group textual chat, a group VoIP chat and/or a group video chat. In some implementations, a user can initiate a group chat from a menu (not shown) provided in the IM interface 420. The user can be requested to invite one or more contacts to the group chat. In response to the request, the user can provide input indicating one or more social circles as distribution for the invitation. In response, a group chat invitation can be issued to each of the contacts in each of the one or more social circles.

In some implementations, a chat-room (e.g., for a video, audio and/or text chat) can be provided, through which the group chat can be performed. A chat-room can be provided as an interface that is replicated on a computing device of each of the group chat participants. Each contact participating in the group chat can input digital content to the chat-room, which is shared with each of the other participating contacts. In some implementations, a chat-room can be provided as a persistent chat-room that corresponds to a particular social circle. For example, a user can "enter" the chat-room at any time and communicate with other contacts that are already present in the chat-room. In some implementations, a chat-room can be provided as an ad hoc chat-room that is generated and displayed to each of the participating contacts in response to a user initiating the group chat.

In some implementations, a contact within a social circle of a user is not a member of the social networking service. For example, the user may add the contact to a social circle based on an email address of the contact. Consequently, digital content that is distributed using the social circle can be distributed to the contact through the email address (e.g., instead of the social networking service). In some implementations, if the user chat-enables the social circle, an explicit invitation can be transmitted to the contact using the email address. Upon confirmation of the contact, the contact can be added to the user's list of contacts in the IM service, and the visibility define by the user through the social circle can be applied to the contact as discussed herein.

Figure 6:
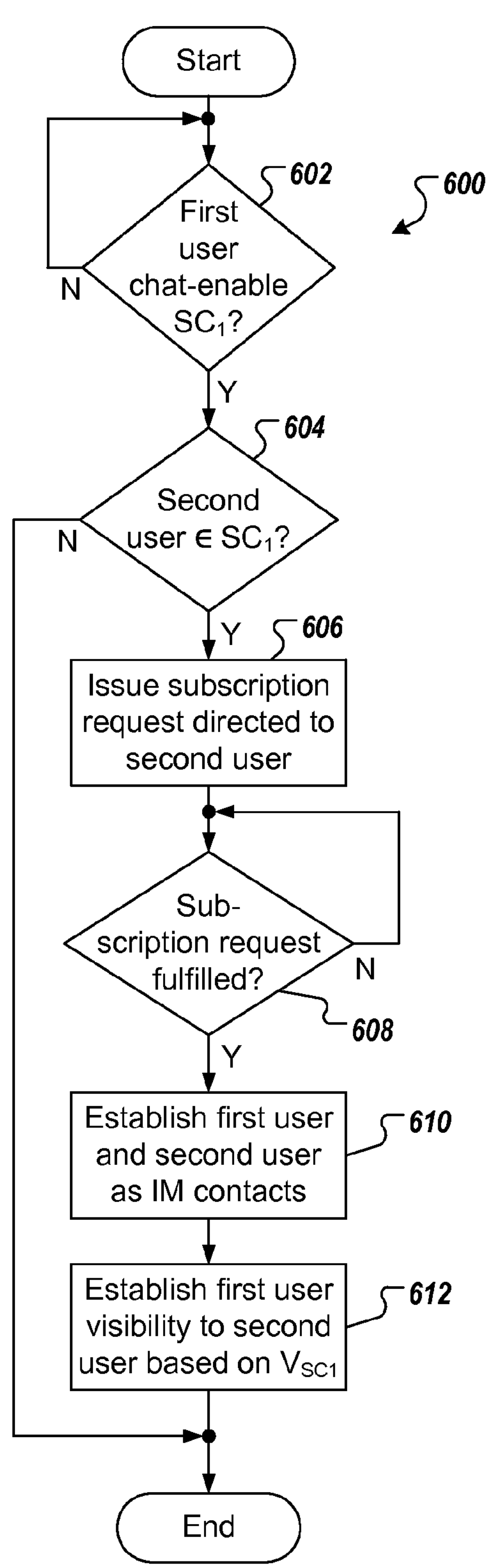
FIG. 6 is a flowchart of an example process that can be executed in implementations of the present disclosure.

FIG. 6 is a flowchart of an example process 600 that can be executed in implementations of the present disclosure. In some implementations, the example process 600 can include operations that are performed using one or more computer programs executed using one or more data processing apparatus (e.g., one or more client-side computing devices and/or one or more server-side computing devices).

It is determined whether a first user has chat-enabled a first social circle (SC1) (602). In some implementations, the determination can be based on user input that is provided through a graphical user interface (GUI) displayed on a computing device. If the first user has not chat-enabled the first social circle, the process 600 loops back to operation 602. If the first user has chat-enabled the first social circle, it is determined whether a second user is a member of the first social circle (604). If the second user is not a member of the first social circle, the process 600 ends. If the second user is a member of the first social circle, a subscription request directed to the second user is issued (606). It is determined whether the subscription request has been fulfilled (608). If the subscription request has not been fulfilled, the process 600 loops back. If the subscription request has been fulfilled, the first user and the second user are established as IM contacts within the IM service (610). The visibility of the first user to the second user is established based on a visibility ($V_{SC1}$) defined by the first user in the first social circle (612) and the process 600 ends.

Figure 7:
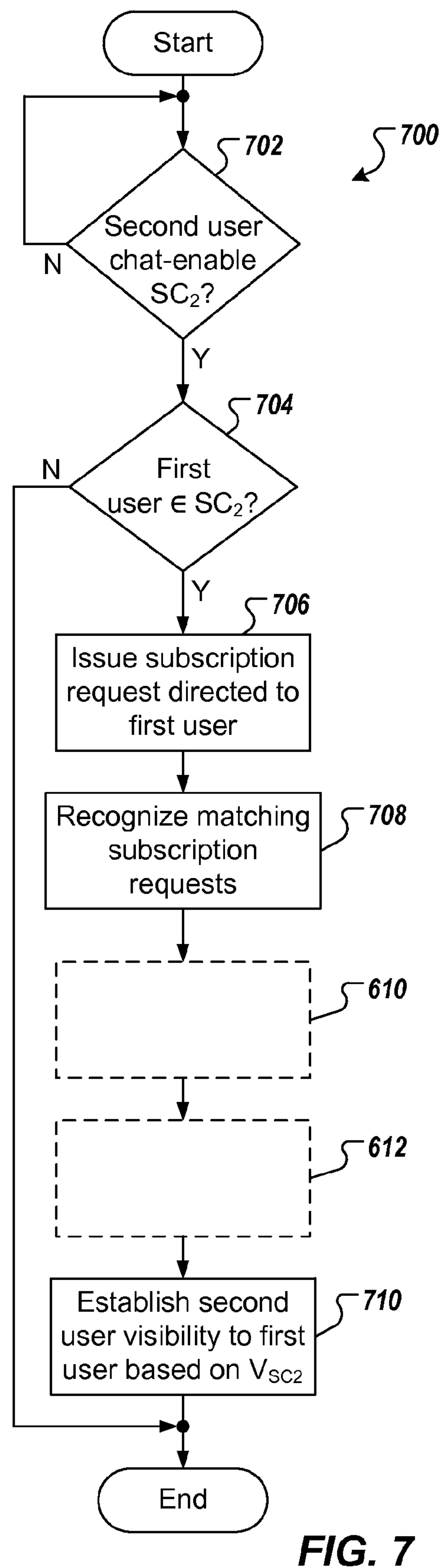
FIG. 7 is a flowchart of an example process that can be executed in implementations of the present disclosure.

FIG. 7 is a flowchart of an example process 700 that can be executed in implementations of the present disclosure. In some implementations, the example process 700 can include operations that are performed using one or more computer programs executed using one or more data processing apparatus (e.g., one or more client-side computing devices and/or one or more server-side computing devices). The example process 700 can be executed in the context of the example process 600 of FIG. 6, and can correspond to an implementation, in which the second user is also a user of the social networking service.

It is determined whether the second user has chat-enabled a second social circle (SC2) (702). If the second user has not chat-enabled a second social circle, the process 700 loops back. If the second user has chat-enabled the second social circle, it is determined whether the first user is a member of the second social circle (704). If the first user is not a member of the second social circle, the process 700 ends. If the first user is a member of the second social circle, a subscription request directed to the first user is issued (706). In the context of the process 600 of FIG. 6, it can occur that a subscription request directed to the second user has issued (606). Consequently, matching subscription requests are recognized (708) in the process 700, and, in the context of the process 600 of FIG. 6, it is determined that subscription requests have been fulfilled (608). The operations 610 and 612 can be performed, as discussed above. The visibility of the second user to the first user is established based on a visibility ($V_{SC2}$) defined by the second user in the second social circle (612) and the process 700 ends.

Figure 8:
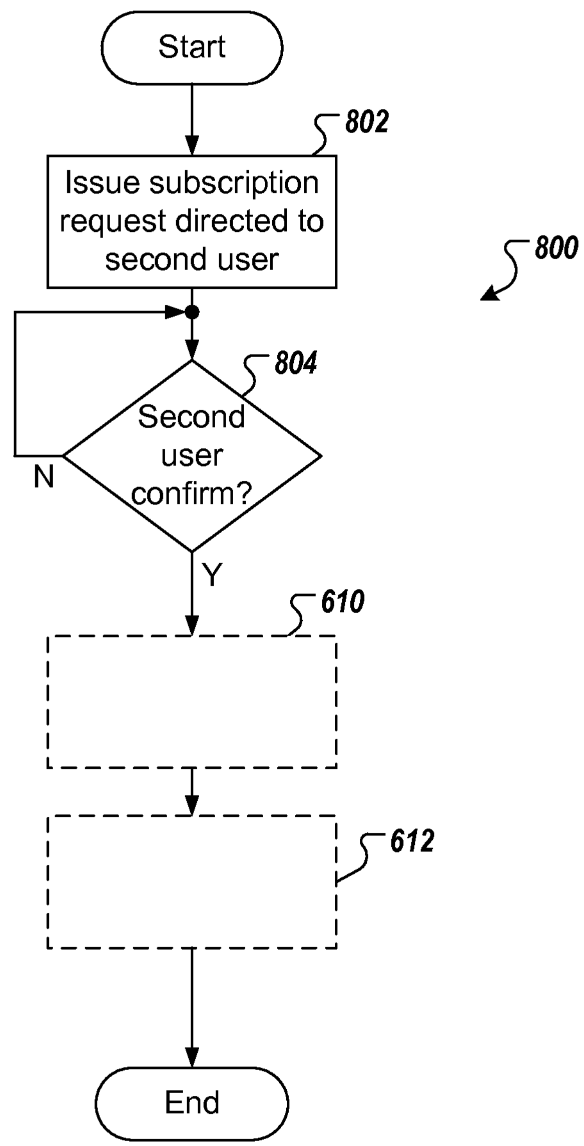
FIG. 8 is a flowchart of an example process that can be executed in implementations of the present disclosure.

FIG. 8 is a flowchart of an example process 800 that can be executed in implementations of the present disclosure. In some implementations, the example process 800 can include operations that are performed using one or more computer programs executed using one or more data processing apparatus (e.g., one or more client-side computing devices and/or one or more server-side computing devices). The example process 800 can be executed in the context of the example process 600 of FIG. 6, and can correspond to an implementation, in which the second user is not a user of the social networking service.

A subscription request can be issued to the second user (802), which corresponds to the operation 606 of FIG. 6. Because, in the context of the process 800, the second user is not a user of the social networking service, the subscription request can include an explicit invitation that is transmitted to the second user (e.g., via email) to invite the second user to participate as a contact within the IM service and/or the social networking service. It is determined whether the second user has confirmed the subscription request (804). If the second user has not confirmed the subscription request, the process 800 loops back. If the second user has confirmed the subscription request, matching subscription requests are recognized and, in the context of the process 600 of FIG. 6, it is determined that subscription requests have been fulfilled (608). The operations 610 and 612 can be performed, as discussed above.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims. For example, many of the examples described are directed to IM services, but other chat services (e.g., video, audio and/or text chat) can be used.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementation s are within the scope of the following claims. For example, the actions recited in the claims can be performed in a different order and still achieve desirable results.

What is claimed is:

1. A system comprising:

a processor; and a memory coupled to the processor and having instructions stored thereon which, when executed by the processor, cause the processor to perform operations comprising:

identifying a first social circle and a type of the first social circle of a first user, the first social circle including a second user;

transmitting first set of instructions to a client device of the first user that cause a display of the first social circle, the display of the first social circle including a selectable graphical element for the first user to perform an action;

receiving, from the first user, the action including chat-enablement of the first social circle;

responsive to receiving the action including the chat-enablement of the first social circle, chat-enabling the first social circle;

issuing a chat service subscription request for the first social circle;

determining whether the chat service subscription request associated with the second user is fulfilled;

responsive to determining that the chat service subscription request associated with the second user is fulfilled, transmitting second set of instructions to the client device of the first user that cause a display of an instant messaging interface of an instant messaging service, the instant messaging interface including a list of contacts of the first user, and establishing the second user as a messaging contact in the list of contacts of the first user; and ordering the list of contacts of the first user based on the type of the first social circle.

2. The system of claim 1, wherein the operations further comprise:

identifying a second social circle of the second user, the second social circle including the first user;

chat-enabling the second social circle in response to user input provided by the second user, and wherein determining that the chat service subscription request associated with the second user is fulfilled comprises determining that the second social circle is chat-enabled.

3. The system of claim 1, wherein the chat service subscription request associated with the second user comprises an explicit notification to the second user inviting the second user to become the messaging contact of the first user.

4. The system of claim 3, wherein determining that the chat service subscription request associated with the second user is fulfilled comprises sending the explicit notification to the second user inviting the second user to become the messaging contact of the first user and receiving a confirmation from the second user.

5. The system of claim 1, wherein the operations further comprise:

setting a visibility of the first user in the instant messaging interface of the instant messaging service based on user input associated with the first social circle;

determining an availability status of the first user with respect to the second user based on the visibility; and transmitting availability data to display the availability status of the first user to the second user.

6. The system of claim 1, wherein the operations further comprise identifying a third social circle of the first user, the third social circle including the second user, and chat-enabling the third social circle in response to user input provided by the first user.

7. The system of claim 6, wherein the operations further comprise:

setting a first visibility of the first user in the instant messaging interface of the instant messaging service based on user input associated with the first social circle;

setting a second visibility of the first user in the instant messaging interface of the instant messaging service based on user input associated with the third social circle;

determining an availability status of the first user with respect to the second user based on the first visibility and the second visibility; and transmitting availability data to display the availability status of the first user to the second user.

8. The system of claim 1, wherein the operations further comprise:

identifying a fourth social circle of the first user, the fourth circle including a third user;

chat-enabling the fourth social circle in response to user input provided by the first user;

determining that a chat service subscription request associated with the third user is fulfilled; and in response to determining that the chat service subscription request associated with the third user is fulfilled, adding the third user as a messaging contact in the list of contacts of the first user.

9. The system of claim 8, wherein the operations further comprise:

setting a first visibility of the first user in the instant messaging interface of the instant messaging service based on user input associated with the first social circle;

setting a second visibility of the first user in the instant messaging interface of the instant messaging service based on user input associated with the fourth social circle;

determining a first availability status of the first user with respect to the second user based on the first visibility;

determining a second availability status of the first user with respect to the third user based on the second visibility; and transmitting availability data to display the first availability status to the second user and to display the second availability status to the third user.

10. The system of claim 9, wherein the first availability status and the second availability status are different.

11. The system of claim 8, wherein the operations further comprise:

receiving a request from the first user to display a web page associated with the first social circle; and transmitting web page data and chat display instructions to the client device of the first user that cause a display of the web page to the first user, wherein the chat display instructions, when executed, cause the display of the instant messaging interface of the instant message service in the web page, wherein the second user is listed first in the list of contacts of the first user compared to the third user.

12. The system of claim 8, wherein the operations further comprise:

receiving a request from the first user to display a web page associated with the fourth social circle; and transmitting web page data and chat display instructions to the client device of the first user that cause a display of the web page to the first user, wherein the chat display instructions, when executed, cause the display of the instant messaging interface of the instant message service in the web page, wherein the third user is listed first in the list of contacts of the first user compared to the second user.

13. The system of claim 1, wherein the first social circle comprises one from a group of a personal social circle, a shared private social circle and a shared public social circle.

14. A non-transitory computer storage media encoded with one or more computer programs, the one or more computer programs comprising instructions that when executed by data processing apparatus cause the data processing apparatus to perform operations comprising:

identifying a first social circle and a type of the first social circle of a first user, the first social circle including a second user;

transmitting first set of instructions to a client device of the first user that cause a display of the first social circle, the display of the first social circle including a selectable graphical element for the first user to perform an action;

receiving, from the first user, the action including chat-enablement of the first social circle;

responsive to receiving the action including the chat-enablement of the first social circle, chat-enabling the first social circle;

issuing a chat service subscription request for the first social circle;

determining whether the chat service subscription request associated with the second user is fulfilled;

response responsive to determining that the chat service subscription request associated with the second user is fulfilled, transmitting second set of instructions to the client device of the first user that cause a display of an instant messaging interface of an instant messaging service, the instant messaging interface including a list of contacts of the first user, and establishing the second user as a messaging contact in the list of contacts of the first user; and ordering the list of contacts of the first user based on the type of the first social circle.

15. A computer-implemented method comprising:

identifying a first social circle and a type of the first social circle of a first user, the first social circle including a second user;

transmitting first set of instructions to a client device of the first user that cause a display of the first social circle, the display of the first social circle including a selectable graphical element for the first user to perform an action;

receiving, from the first user, the action including chat-enablement of the first social circle;

responsive to receiving the action including the chat-enablement of the first social circle, chat-enabling the first social circle;

issuing a chat service subscription request for the first social circle;

determining whether the chat service subscription request associated with the second user is fulfilled;

responsive to determining that the chat service subscription request associated with the second user is fulfilled, transmitting second set of instructions to the client device of the first user that cause a display of an instant messaging interface of an instant messaging service, the instant messaging interface including a list of contacts of the first user, and establishing the second user as a messaging contact in the list of contacts of the first user; and ordering the list of contacts of the first user based on the type of the first social circle.

* * * * *

UNITED STATES PATENT AND TRADEMARK OFFICE
CERTIFICATE OF CORRECTION

PATENT NO. : 9,577,836 B1
APPLICATION NO. : 14/480536
DATED : February 21, 2017
INVENTOR(S) : Matthew John Leske et al.

It is certified that error appears in the above-identified patent and that said Letters Patent is hereby corrected as shown below:

In the Specification

In Column 1, Line 32, please replace "other's'" with --other's--

In Column 5, Line 1, please replace "Though" with --Through--

In Column 10, Line 8, please delete "that"

In Column 10, Line 13, please replace "circle" with --circles--

In Column 15, Line 42, after ranking please insert --,--

In Column 16, Line 1, please delete "be"

In Column 18, Line 66, after magnetic please insert --disks--

In Column 20, Line 13, please replace "implementation s" with --implementations--

In the Claims

In Column 20, Line 27, after transmitting please insert --a--

In Column 20, Line 43, after transmitting please insert --a--

In Column 22, Line 34, after transmitting please insert --a--

In Column 22, Line 48, please delete "response"

In Column 22, Line 50, after transmitting please insert --a--

Signed and Sealed this
Eleventh Day of April, 2017

Michelle K. Lee
*Director of the United States Patent and Trademark Office*

CERTIFICATE OF CORRECTION (continued)
U.S. Pat. No. 9,577,836 B1

In Column 22, Line 63, after transmitting please insert --a--

In Column 23, Line 12, after transmitting please insert --a--